(12) United States Patent
Mizutani et al.

(10) Patent No.: US 10,794,685 B2
(45) Date of Patent: Oct. 6, 2020

(54) OPTICAL MEASUREMENT SYSTEM (71) Applicant: OMRON Corporation, Kyoto (JP)

(72) Inventors: Koki Mizutani, Ayabe (JP); Takahiro Suga, Fukuchiyama (JP); Hiroaki Takimasa, Ayabe (JP)

(73) Assignee: OMRON Corporation, Kyoto (JP)

( * ) Notice: Subject to any disclaimer, the term of this patent is extended or adjusted under 35 U.S.C. 154(b) by 394 days.

(21) Appl. No.: 15/814,407

(22) Filed: Nov. 16, 2017

(65) Prior Publication Data
US 2018/0238678 A1 Aug. 23, 2018

(30) Foreign Application Priority Data

Feb. 23, 2017 (JP) ................................. 2017-032291

(51) Int. Cl.
G01B 11/02 (2006.01)
G01S 17/42 (2006.01)
G01B 11/24 (2006.01)
G01B 21/04 (2006.01)

(52) U.S. Cl.
CPC ............ *G01B 11/026* (2013.01); *G01B 11/24* (2013.01); *G01B 21/04* (2013.01); *G01S 17/42* (2013.01)

(58) Field of Classification Search
CPC ...... G01J 3/28; G01J 3/433; G01J 3/26; G01J 3/10; G01B 11/14; G01B 11/24
See application file for complete search history.

(56) References Cited

U.S. PATENT DOCUMENTS

| 7,995,055 | B1 * | 8/2011 | Ma ....................... G06K 9/4604 345/420 |
| 2016/0103224 | A1 | 4/2016 | Stettner et al. |
| 2017/0059408 | A1 * | 3/2017 | Korner ............... G01B 11/2536 |

FOREIGN PATENT DOCUMENTS

| CN | 2515653 | 10/2002 |
| CN | 1670508 | 9/2005 |
| CN | 1853004 | 10/2006 |
| CN | 1924774 | 3/2007 |
| CN | 101655601 | 2/2010 |

(Continued)

OTHER PUBLICATIONS

"Office Action of China Counterpart Application", dated Aug. 29, 2019, with English translation thereof, p. 1-p. 12.

(Continued)

*Primary Examiner* — Luke D Ratcliffe
(74) *Attorney, Agent, or Firm* — JCIPRNET (57) ABSTRACT

An optical measurement system calculates a distance between an optical system and a measurement object based on reflected light beams corresponding to cores, compares a value indicating the distance with a threshold value for each of the reflected light beams, calculates an average value of all the values indicating the distance when the values in the reflected light beams corresponding to all the cores are equal to or greater than the threshold value or the values are less than the threshold value, and calculates an average value of the values indicating the distance which are equal to or greater than the threshold value or an average value of the values indicating the distance which are less than the threshold values when the values corresponding to some cores are equal to or greater than the threshold value and the values corresponding to the other cores are less than the threshold value.

16 Claims, 9 Drawing Sheets (56) References Cited

FOREIGN PATENT DOCUMENTS

| | | | | |
|---|---|---|---|---|
| CN | 102591120 | 7/2012 | | |
| CN | 102853908 | 1/2013 | | |
| CN | 102933934 | 2/2013 | | |
| CN | 103076002 | 5/2013 | | |
| CN | 103434149 | 12/2013 | | |
| CN | 103673887 | 3/2014 | | |
| CN | 104797904 | 7/2015 | | |
| CN | 104919272 | 9/2015 | | |
| EP | 2500685 | 9/2012 | | |
| EP | 2950039 A1 * | 12/2015 | ……….. | G01B 11/026 |
| JP | H109815 | 1/1998 | | |
| JP | 2011089962 | 5/2011 | | |
| JP | 2012-208102 | 10/2012 | | |
| JP | 2014209075 | 11/2014 | | |
| KR | 20140005781 | 1/2014 | | |
| KR | 20150105441 | 9/2015 | | |

OTHER PUBLICATIONS

"Office Action of Korea Counterpart Application," with English translation thereof, dated Jul. 31, 2018, p. 1-p. 14.

\* cited by examiner

OPTICAL MEASUREMENT SYSTEM

CROSS-REFERENCE TO RELATED APPLICATION

This application claims the priority benefit of Japan Application no. 2017-032291, filed on Feb. 23, 2017. The entirety of the above-mentioned patent application is hereby incorporated by reference herein and made a part of this specification.

BACKGROUND OF THE INVENTION

Field of the Invention

An aspect of the invention relates to an optical measurement system.

Description of Related Art

An optical measurement system of a white confocal system is known as a device that measures a surface profile of a measurement object or the like in a noncontact manner (for example, see Patent Document 1).

When white light is used in a confocal system, there is a problem in that light efficiency is lower than that in a triangulation system using a monochromic laser beam due to the principle that only a specific wavelength component corresponding to a distance among wavelength components of emitted light is used. With regard to this problem, a technique of increasing an amount of light using a plurality of cores has been proposed. A technique of irradiating a measurement object with light from a plurality of cores, acquiring a plurality of measured values based on reflected light which is reflected from the measurement object, and averaging all of the plurality of measured values to acquire a single measured value has been proposed.

PRIOR ART DOCUMENT

Patent Documents

[Patent Document 1] Japanese Unexamined Patent Application Publication No. 2012-208102 (published on Oct. 25, 2012)

SUMMARY OF THE INVENTION

However, in the above-mentioned related art, all of a plurality of measured values are indiscriminately averaged to acquire a single measured value. Accordingly, there is a problem in that a measured value at a position at which a surface profile of a measurement object varies finely may be smoothed and the surface profile of the measurement object cannot be accurately measured.

An object of an aspect of the invention is to accurately measure a surface profile of a measurement object regardless of the surface profile of the measurement object.

In order to achieve the above-mentioned object, according to an aspect of the invention, there is provided an optical measurement system including: a light source; an optical system disposed to face an irradiation light beam from the light source and configured to irradiate a measurement object with the irradiation light beam and to receive a reflected light beam from a measuring surface of the measurement object; at least one spectroscope configured to separate the reflected light beams received by the optical system into wavelength components; a light receiving unit in which a plurality of light receiving elements are arranged in a separation direction of the spectroscope; a light guide unit configured to include a plurality of cores, to optically connect the light source and the optical system, and to optically connect the optical system and the spectroscope; and a processing unit, wherein the processing unit is configured to calculate a distance between the optical system and the measurement object based on the reflected light beam for each of the reflected light beams corresponding to the cores, to compare a value indicating the distance with a threshold value for each of the reflected light beams, to calculate an average value of all the values indicating the distance when the values indicating the distance in the reflected light beams corresponding to all the cores are equal to or greater than the threshold value or the values indicating the distance are less than the threshold value, and to calculate an average value of the values indicating the distance which are equal to or greater than the threshold value or an average value of the values indicating the distance which are less than the threshold values when the values indicating the distance in the reflected light beams corresponding to some cores are equal to or greater than the threshold value and the values indicating the distance in the reflected light beams corresponding to the other cores are less than the threshold value.

An object having a profile which has a plurality of flat surfaces with different heights and having a rapid change in height at boundaries between the flat surfaces is assumed as the measurement object. In this configuration, when the distances measured at a plurality of positions are simply averaged, there is a problem in that a rapid change in height at the boundaries cannot be accurately measured.

On the other hand, according to the above-mentioned configuration, when the values indicating the distance in the reflected light beams corresponding to all the cores are equal to or greater than the threshold value or the values indicating the distance are less than the threshold value, an average of all the values indicating the distance is calculated. Accordingly, in this case, since all measuring points are conceived as being placed on a specific flat surface with the same height, it is possible to the accurately measure the eight of the flat surface.

According to the above-mentioned configuration, when the values indicating the distance in the reflected light beams corresponding to some cores are equal to or greater than the threshold value and the values indicating the distance in the reflected light beams corresponding to the other cores are less than the threshold value, an average value of the values indicating the distance which are equal to or greater than the threshold value or an average of the values indicating the distance which are less than the threshold value is calculated. Accordingly, in this case, since measuring points are conceived as being placed on two flat surfaces with different heights, it is possible to accurately measure the heights of the flat surfaces by calculating the average values with the threshold value as a boundary.

Accordingly, it is possible to more accurately measure a profile of a measurement object having a plurality of flat surfaces with different heights.

In the optical measurement system according to the aspect of the invention, the processing unit may calculate the threshold value based on the values indicating the distance before and after a change when the distance changes to be greater than a predetermined value.

According to this configuration, it is possible to determine the threshold value depending on a profile of a measurement object.

In the optical measurement system according to the aspect of the invention, the light receiving unit may include a plurality of light receiving units to correspond to the reflected light beams corresponding to the cores.

According to this configuration, since a plurality of light receiving units are provided to correspond to the reflected light beams corresponding to the cores, the light source can simultaneously irradiate a plurality of cores with the irradiation light beams. Accordingly, the light source can be provided as a single element.

In the optical measurement system according to the aspect of the invention, the plurality of light receiving elements may be arranged two-dimensionally on a light receiving surface of the light receiving unit to correspond to the reflected light beams corresponding to the cores.

According to this configuration, it is possible to receive reflected light beams guided from a plurality of cores using a single light receiving unit.

In the optical measurement system according to the aspect of the invention, the light source may include a plurality of light sources, positions at which the measurement object may be irradiated with irradiation light beams emitted from the light sources are different from each other, and the processing unit may calculate the distance between the optical system and the measurement object based on the reflected light beams for each of the reflected light beams corresponding to the cores by setting a light irradiation time to be different depending on the light sources.

According to this configuration, the light receiving unit does not need to be provided for each of the reflected light beams corresponding to the cores because a plurality of light sources are provided.

In the optical measurement system according to the aspect of the invention, the processing unit may extract a temporal change point at which the value indicating the distance changes to be equal to or greater than the threshold value for each of the cores, arrange the temporal change points corresponding to all the cores, and then calculate an average value of the values indicating the distance which are equal to or greater than the threshold value or an average value of the values indicating the distance which are less than the threshold value.

According to this configuration, it is possible to correct unevenness of measured positions by setting a time axis to vary.

According to an aspect of the invention, it is possible to accurately measure a surface profile of a measurement object.

DESCRIPTION OF THE EMBODIMENTS

First Embodiment

Hereinafter, embodiments of the invention will be described in detail.

Configuration of Optical Measurement System

Figure 1:
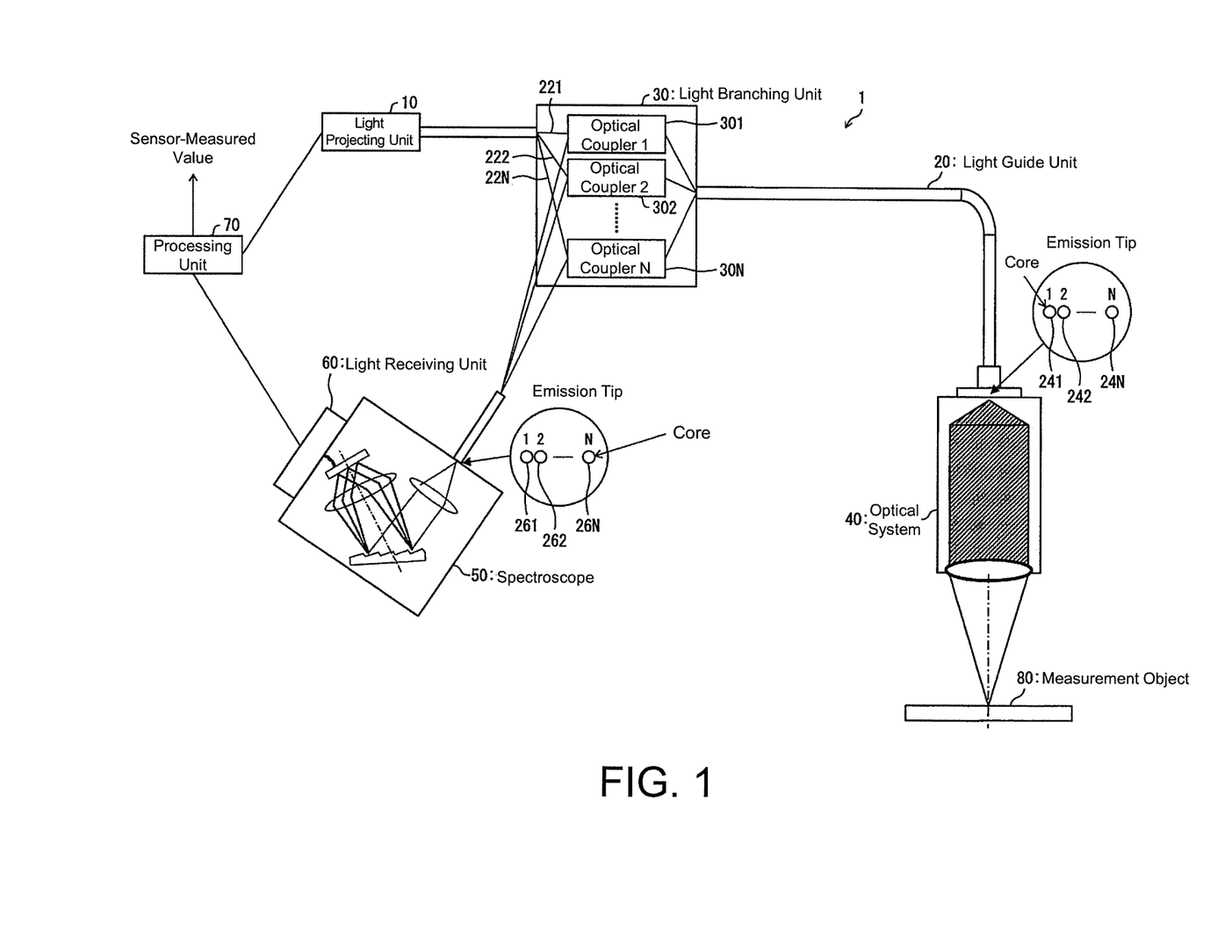
FIG. 1 is a conceptual diagram illustrating an example of a system configuration of an optical measurement system according to a first embodiment of the invention.
Figure 2:
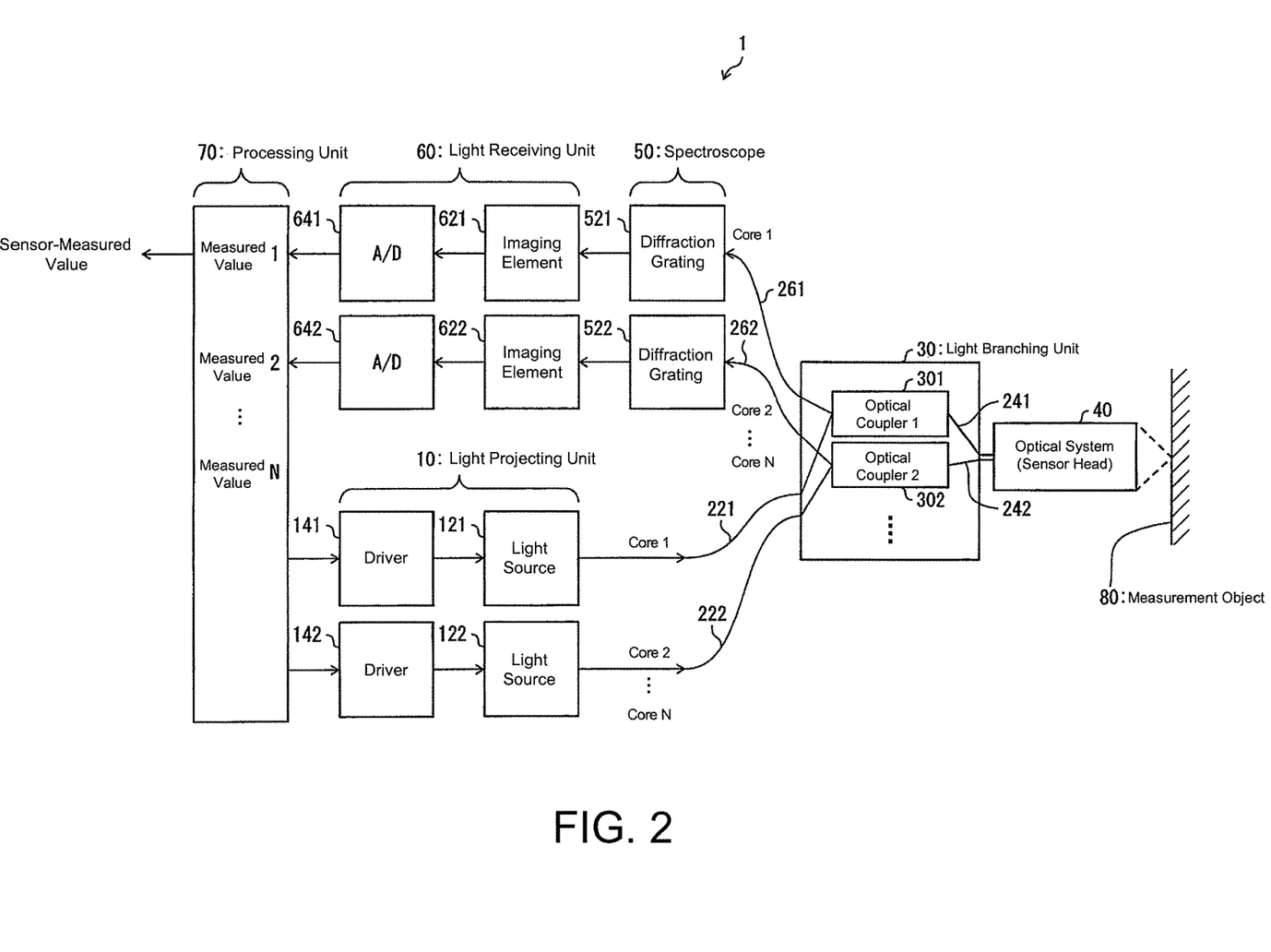
FIG. 2 is a schematic diagram illustrating an example of the system configuration of the optical measurement system according to the first embodiment of the invention.

A configuration of an optical measurement system 1 according to a first embodiment of the invention will be described below with reference to FIGS. 1 and 2. FIG. 1 is a schematic diagram illustrating an example of the optical measurement system 1 according to the first embodiment. FIG. 2 is a schematic diagram illustrating an example of a system configuration of the optical measurement system 1 according to the first embodiment.

The optical measurement system 1 includes a light projecting unit 10, a light guide unit 20, a light branching unit 30, an optical system 40, a spectroscope 50, a light receiving unit 60, and a processing unit 70.

The optical measurement system 1 can project a plurality of light beams generated by the light projecting unit 10 to a plurality of positions (hereinafter referred to as spots) on a measuring surface of a measurement object 80 and calculate a distance between the optical system 40 and the measurement object 80 based on reflected light beams from the spots. In this embodiment, the optical measurement system 1 can calculate the distance between the optical system 40 and the measurement object 80 using a white confocal system. That is, the optical measurement system 1 can calculate the distance between the optical system 40 and the measurement object 80 based on measured values when the light beams are focused on the measuring surface of the measurement object 80.

The light projecting unit 10 includes a plurality of light sources 121, 122, . . . , 12N and a plurality of drivers 141, 142, . . . , 14N.

The light guide unit 20 connects the light projecting unit 10 and the light branching unit 30 and connects the light branching unit 30 and the optical system 40. The light guide unit 20 that connects the light projecting unit 10 and the light branching unit 30 includes a plurality of cores 221, 222, . . . , 22N. The light guide unit 20 that connects the light branching unit 30 and the optical system 40 includes a plurality of cores 241, 242, . . . , 24N. The light guide unit 20 guides light beams generated by the light sources 121, 122, . . . , 12N to the optical system 40 via the cores 221, 222, . . . , 22N, the light branching unit 30, and the cores 241, 242, . . . , 24N.

The light guide unit 20 connects the light branching unit 30 and the spectroscope 50. The light guide unit 20 that connects the light branching unit 30 and the spectroscope 50 includes a plurality of cores 261, 262, . . . , 26N. The light guide unit 20 guides reflected light beams reflected from the measuring surface of the measurement object 80 and received by the optical system 40 to the spectroscope 50 via the cores 261, 262, . . . , 26N.

The light sources 121, 122, . . . , 12N input light beams to the cores 221, 222, . . . , 22N. The light sources 121, 122, . . . , 12N generate light beams including a plurality of wavelength components. For example, the light sources 121, 122, . . . , 12N are white light emitting diodes (LEDs).

The drivers 141, 142, . . . , 14N turn on the light sources 121, 122, . . . , 12N under the control of the processing unit 70.

The light branching unit 30 branches an optical path from the light projecting unit 10 to the optical system 40 for each core of the light guide unit 20. The light branching unit 30 branches an optical path from the optical system 40 to the spectroscope 50 for each core of the light guide unit 20. The light branching unit 30 includes a plurality of optical couplers 301, 302, . . . , 30N.

The optical system 40 emits the light beams generated by the light sources 121, 122, . . . , 12N to the measuring surface of the measurement object 80. The optical system 40 receives the reflected light beams reflected from the measuring surface of the measurement object 80 and guides the received light beams to the light guide unit 20. Specifically, the optical system 40 irradiates the measurement object 80 with a plurality of irradiation light beams passing through the cores 241, 242, . . . , 24N of the light guide unit 20 and guides reflected light beams thereof to the spectroscope 50 via the cores 241, 242, . . . , 24N, the light branching unit 30, and the cores 261, 262, . . . , 26N.

The surfaces of the optical system 40 facing the measurement object 80 includes a plurality of pinholes corresponding to the plurality of cores 241, 242, . . . , 24N. A plurality of light beams are applied to the measurement object 80 from the corresponding pinholes.

The spectroscope 50 includes diffraction gratings 521, 522, . . . , 52N. The diffraction gratings 521, 522, . . . , 52N are provided to correspond to the cores 261, 262, . . . , 26N of the light guide unit 20. The spectroscope 50 separates a plurality of reflected light beams passing through the cores 261, 262, . . . , 26N of the light guide unit 20 by wavelength components. The spectroscope 50 guides the separated reflected light beams to the light receiving unit 60. The spectroscope 50 may employ an arbitrary device other than the diffraction gratings as long as it can separate the reflected light beams by wavelength components.

The light receiving unit 60 includes imaging elements 621, 622, . . . , 62N and A/D converters 641, 642, . . . , 64N. The imaging elements 621, 622, . . . , 62N and the analog-digital converters 641, 642, . . . , 64N are provided to correspond to the cores 261, 262, . . . , 26N of the light guide unit 20. The imaging elements 621, 622, . . . , 62N are one-dimensional imaging elements in which a plurality of light receiving elements are one-dimensionally arranged. The plurality of light receiving elements are arranged in the separation direction in the spectroscope 50. The light-receiving elements of the imaging elements 621, 622, . . . , 62N receive the wavelength components of the reflected light beams. The light receiving elements detect intensities of the reflected light beams, which have been separated by wavelength components by the spectroscope 50, for each wavelength component. The analog-digital converters 641, 642, . . . , 64N convert detection results in an A/D conversion manner and output the converted detection results as measured values 1, 2, . . . , N to the processing unit 70.

The processing unit 70 comprehensively controls the units of the optical measurement system 1. For example, the processing unit 70 controls turning-on and turning-off of the light sources 121, 122, . . . , 12N. The processing unit 70 can also calculate a distance between the optical system 40 and the measurement object 80 based on measured values 1, 2, . . . , N input from the light receiving unit 60.

Example of Processing Routine of Processing Unit

An example of a processing routine which is performed by the processing unit 70 of the optical measurement system 1 according to this embodiment will be described below with reference to the flowchart illustrated in FIG. 3.

Figure 3:
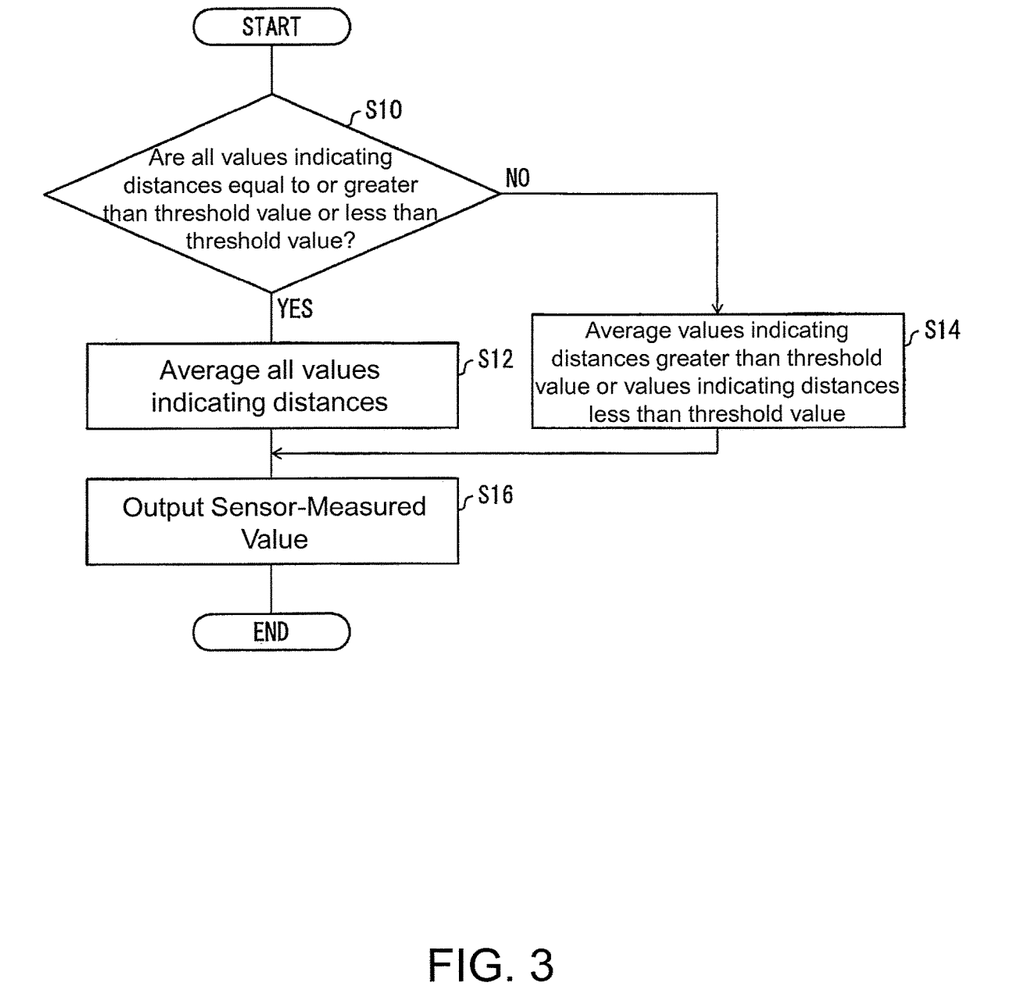
FIG. 3 is a flowchart illustrating an example of a measuring routine which is performed by the optical measurement system according to the first embodiment of the invention.

Before performing the processing routine illustrated in the flowchart of FIG. 3, the processing unit 70 calculates a distance between each of the pinholes and the measuring surface of the measurement object 80 facing the pinholes based on measured values 1, 2, . . . , N corresponding to the cores 241, 242, . . . , 24N.

Step S10

The processing unit 70 compares values indicating the distance for all the cores with a threshold value. The processing unit 70 determines whether all the values indicating the distance are equal to or greater than the threshold value or all the values indicating the distance are less than the threshold value. When the processing unit determines that all the values are equal to or greater than the threshold value or all the values are less than the threshold value (YES), the processing unit 70 performs Step S12. When the processing unit 70 determines that some values are equal to or greater than the threshold value and the other values are less than the threshold value (NO), the processing unit 70 performs Step S14.

Step S12

The processing unit 70 calculates an average value of all the values indicating the distance.

Step S14

The processing unit 70 calculates an average value of the values indicating the distance which are equal to or greater than the threshold value or calculates an average value indicating the distance which are less than the threshold value. When some values indicating the distance are equal to or greater than the threshold value and the other values are less than the threshold value, measuring points are considered to be distributed to two flat surfaces having different heights and thus the processing unit can accurately measure the heights of the flat surfaces by calculating the average values using the threshold value as a boundary. The processing unit 70 may use one group including more values out of a group of the values indicating the distance which are equal to or greater than the threshold value and a group of the values indicating the distance which are less than the threshold value to calculate the average value.

Step S16

The processing unit 70 outputs the average value calculated in Step S12 or Step S14 as a sensor-measured value.

In this way, the optical measurement system 1 according to this embodiment can perform accurate measurement when the measurement object 80 has a flat profile and when the measurement object 80 has a finely changing profile.

The threshold value which is used in Step S10 will be described below.

The processing unit 70 calculates the distances corresponding to the cores 241, 242, . . . , 24N whenever the light sources 121, 122, . . . , 12N emit light beams. The processing unit 70 extracts positions at which a difference in the distances corresponding to the cores 241, 242, . . . , 24N is less than a predetermined value as level positions and calculates a distance to the level positions by averaging the values indicating the distances. The predetermined value is a limit value of values which are determined to be a difference in distances at which the profile of the measurement object 80 is not considered to change greatly. In other words, when the difference in distances is greater than the predetermined value, the profile of the measurement object 80 can be considered to change greatly. The processing unit 70 extracts a plurality of level positions. The processing unit 70 determines a threshold value which is used to calculate the sensor-measured value at a position between neighboring level positions to be a value between the distances at the neighboring level positions.

Figure 4:
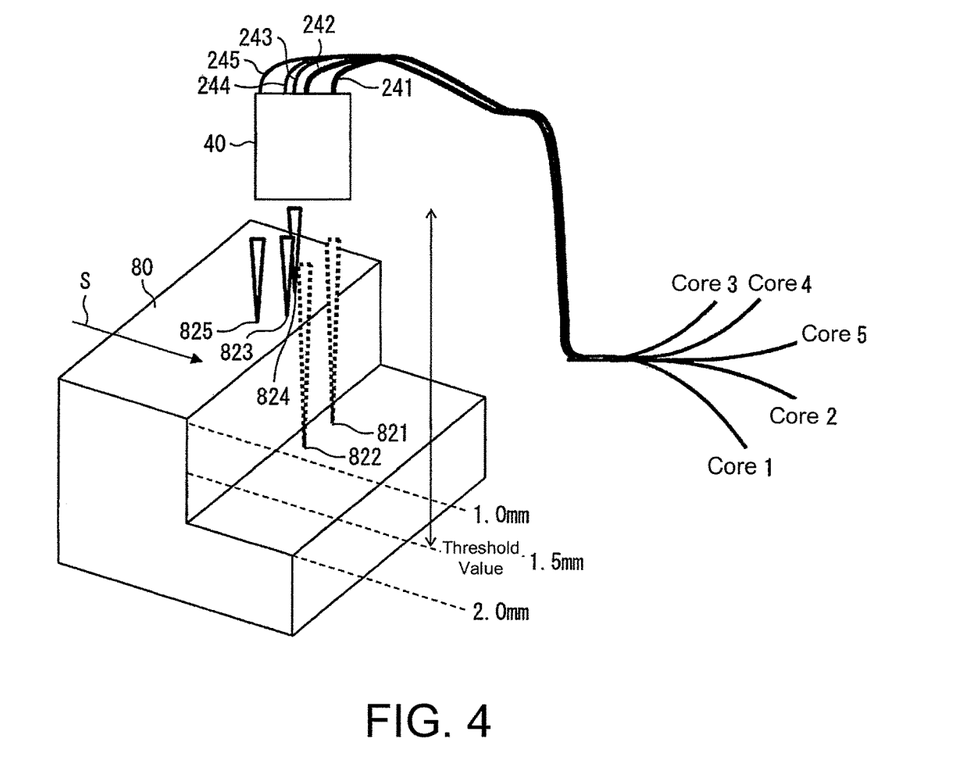
FIG. 4 is a schematic diagram illustrating the number of spots which are formed at a plurality of positions on a measurement surface by emitted light and the positions of the spots in the optical measurement system according to the first embodiment of the invention.

FIG. 4 illustrates a case in which a position at which the profile of the measurement object 80 changes is irradiated with light by the optical system 40.

As illustrated in FIG. 4, an irradiation light beam passing through the core 241 is applied to a spot 821 on the measuring surface of the measurement object 80. Similarly, an irradiation light beam passing through the core 242 is applied to a spot 822 on the measuring surface of the measurement object 80, an irradiation light beam passing through the core 243 is applied to a spot 823 on the measuring surface of the measurement object 80, an irradiation light beam passing through the core 244 is applied to a spot 824 on the measuring surface of the measurement object 80, and an irradiation light beam passing through the core 245 is applied to a spot 825 on the measuring surface of the measurement object 80.

The optical system 40 moves in a direction of an arrow S. The optical system 40 irradiates an upstream area in the direction of the arrow S before irradiation in the case illustrated in FIG. 4 and irradiates a downstream area in the direction of the arrow S after the irradiation in the case illustrated in FIG. 4.

Based on reflected light beams received in irradiation before the irradiation in the case illustrated in FIG. 4, the distance of an area including the spots 825, 824, and 823 from the optical system 40 is calculated to be 1.0 mm. Based on reflected light beams received in irradiation after the irradiation in the case illustrated in FIG. 4, the distance of an area including the spots 822 and 821 from the optical system 40 is calculated to be 2.0 mm. The threshold value which is used to calculate a sensor-measured value in the irradiation in the case illustrated in FIG. 4 is determined to be between 1.0 mm and 2.0 mm at 1.5 mm.

In the case illustrated in FIG. 4, a value indicating the distance between the spot 825 and the corresponding pinhole, a value indicating the distance from the pinhole corresponding to the spot 824, and a value indicating the distance from the pinhole corresponding to the spot 823 are less than the threshold value. Accordingly, the processing unit 70 outputs an average value of the value indicating the distance from the pinhole corresponding to the spot 825, the value indicating the distance from the pinhole corresponding to the spot 824, and the value indicating the distance from the pinhole corresponding to the spot 823 as the sensor-measured value.

Figure 5:
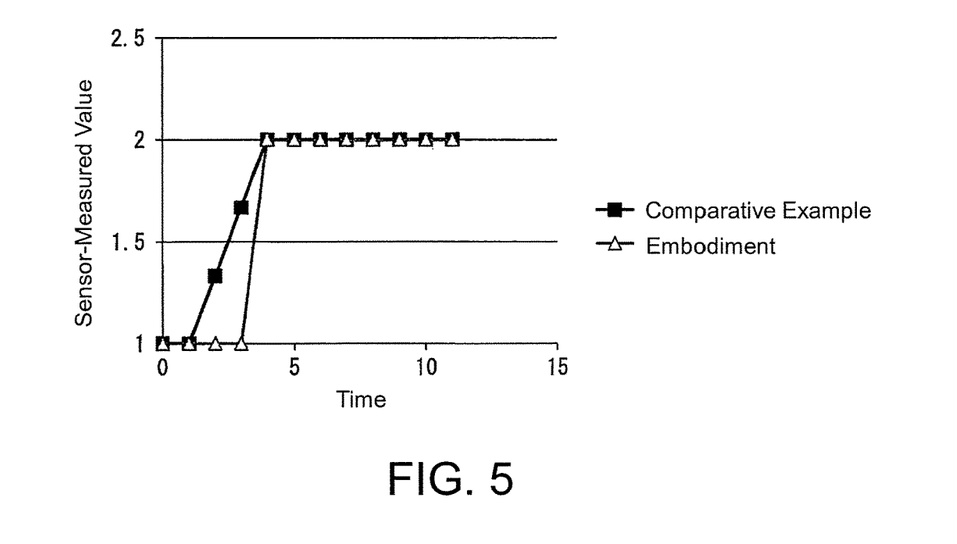
FIG. 5 is a graph illustrating measured values which are acquired by the optical measurement system according to the first embodiment of the invention and measured values which are acquired in a comparative example.

FIG. 5 illustrates sensor-measured values which are acquired by the optical measurement system 1 according to this embodiment and measured values which are acquired by an optical measurement system according to a comparative example.

In the optical measurement device according to the comparative example, the measured values are calculated by indiscriminately averaging a plurality of values indicating a distance without comparing the values indicating the distances which are calculated based on the reflected light beams in the same way as in this embodiment with a threshold value. Here, it is assumed that the measurement object 80 in this embodiment has a profile which has a plurality of flat surfaces having different heights and has a rapid height change at a boundary between the flat surfaces. In this configuration, the rapid height change at the boundary cannot be accurately measured by simply averaging distances measured at a plurality of positions.

On the other hand, in the optical measurement system 1 according to this embodiment, when a condition that all the values indicating the distances are equal to or greater than the threshold value or are less than the threshold value is not satisfied, only the values indicating the distances which are equal to or greater than the threshold value or less than the threshold value are averaged and used as the sensor-measured values. Accordingly, it is possible to accurately measure a rapid height change at a boundary between a plurality of flat surfaces having different heights in the measurement object 80.

Second Embodiment

Another embodiment of the invention will be described below with reference to FIGS. 6 to 8. An optical measurement system 1 according to a second embodiment includes members having the same functions as the members described in the first embodiment and thus description of the members will not be repeated.

Example of Processing Routine of Processing Unit

Figure 6:
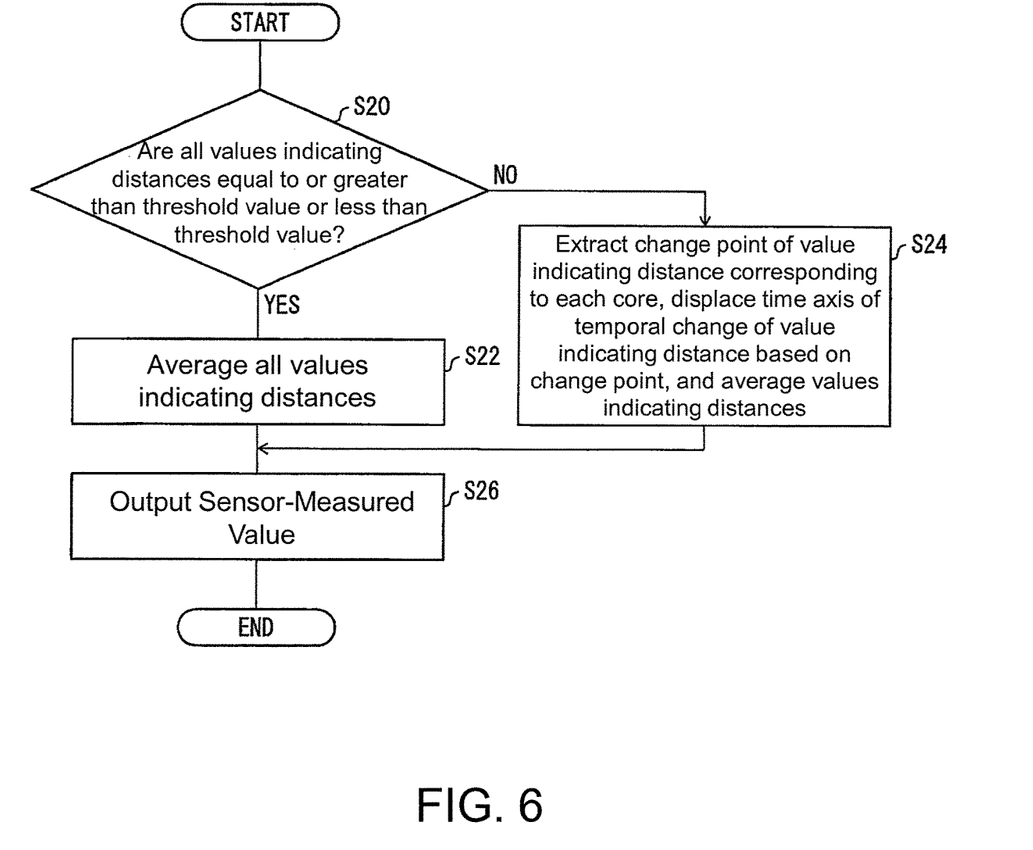
FIG. 6 is a flowchart illustrating an example of a measuring routine which is performed by an optical measurement system according to a second embodiment of the invention.

FIG. 6 is a flowchart illustrating an example of a processing routine which is performed by the processing unit 70 of the optical measurement system 1 according to this embodiment.

Before performing the processing routine illustrated in the flowchart of FIG. 6, the processing unit 70 calculates a distance between each of the pinholes and the measuring surface of the measurement object 80 facing the pinholes based on measured values 1, 2, . . . , N corresponding to the cores 241, 242, . . . , 24N.

Step S20

The processing unit 70 compares values indicating the distance for all the cores with a threshold value. The processing unit 70 determines whether all the values indicating the distance are equal to or greater than the threshold value or all the values indicating the distance are less than the threshold value. When the processing unit 70 determines that all the values are equal to or greater than the threshold value or all the values are less than the threshold value (YES), the processing unit 70 performs Step S22. When the processing unit 70 determines that some values are equal to or greater than the threshold value and the other values are less than the threshold value (NO), the processing unit 70 performs Step S24.

Step S22

The processing unit 70 calculates an average value of all the values indicating the distance.

Step S24

The process of Step S24 will be described below with reference to FIGS. 7A and 7B.

Figures 7A, 7B:
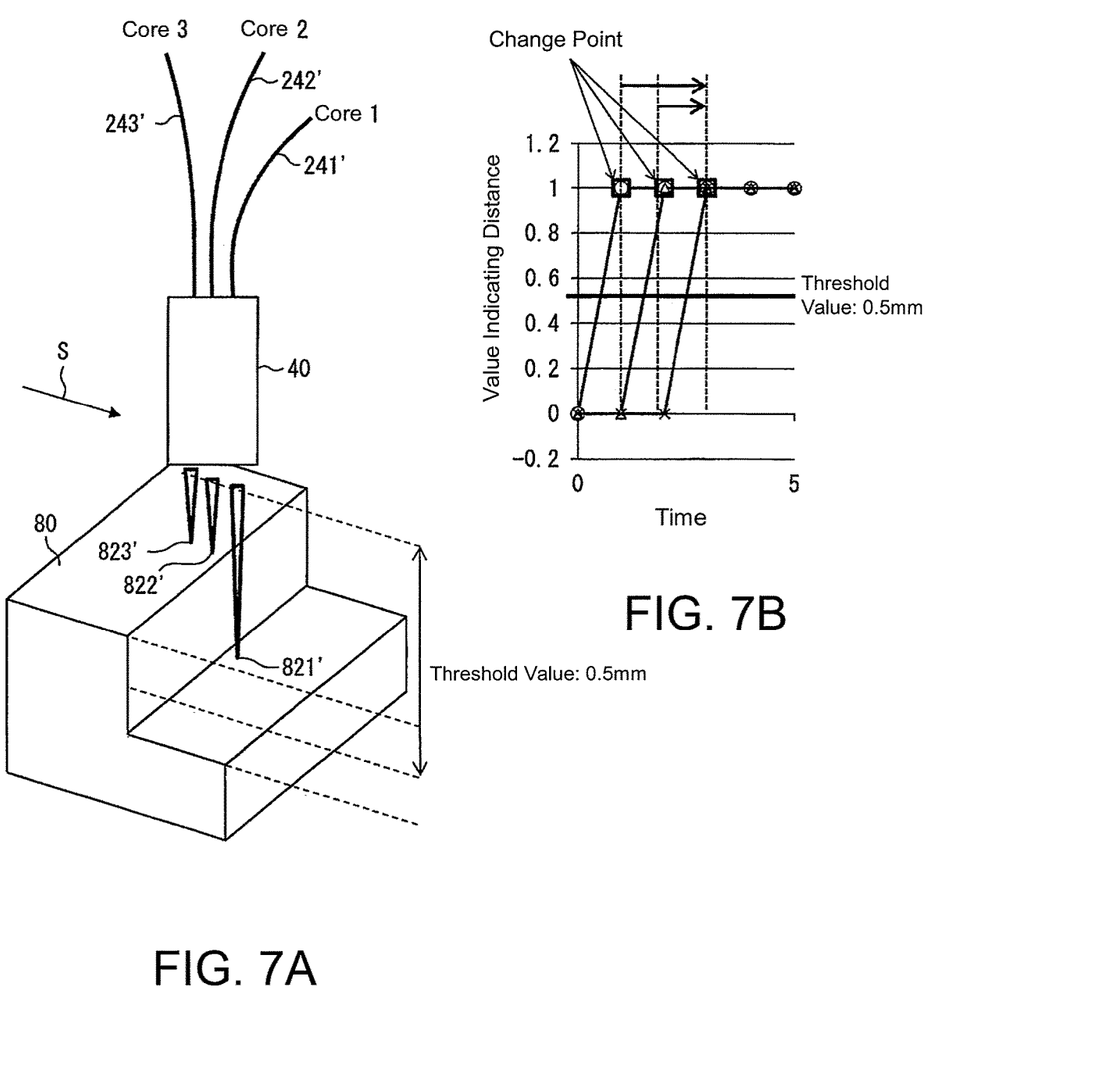
FIGS. 7A and 7B are schematic diagrams illustrating the number of spots which are formed at a plurality of positions on a measurement surface by emitted light and the positions of the spots in an optical measurement system according to a third embodiment of the invention.

FIG. 7A illustrates a case in which the optical system 40 irradiates a position at which the profile of the measurement object 80 changes with light.

As illustrated in FIG. 7A, an irradiation light beam passing through the core 241' is applied to a spot 821' on the measuring surface of the measurement object 80. Similarly, an irradiation light beam passing through the core 242' is applied to a spot 822' on the measuring surface of the measurement object 80 and an irradiation light beam passing through the core 243' is applied to a spot 823' on the measuring surface of the measurement object 80.

FIG. 7B illustrates a temporal change of the values indicating distances corresponding to the cores. In FIG. 7B, a temporal change of a value indicating a distance corresponding to the core 241' is denoted by O, a temporal change of a value indicating a distance corresponding to the core 242' is denoted by Δ, and a temporal change of a value indicating a distance corresponding to the core 243' is denoted by X.

At time 1, a value indicating a distance measured based on an irradiation light beam passing through the core 241' changes to be equal to or greater than a threshold value. This time point is referred to as a temporal change point. At time 1, a value indicating a distance measured based on an irradiation light beam passing through the core 242' is 0 mm, and a value indicating a distance measured based on an irradiation light beam passing through the core 243' is 0 mm. That is, FIG. 7A illustrates irradiation at time 1.

At time 2, the value indicating the distance measured based on the irradiation light beam passing through the core 242' changes to be equal to or greater than the threshold value. That is, the temporal change point of the value indicating the distance corresponding to the cores 242' is time 2. At time 2, the value indicating the distance measured based on the irradiation light beam passing through the core 243' is maintained at 0 mm.

At time 3, the value indicating the distance measured based on the irradiation light beam passing through the core 243' changes to be equal to or greater than the threshold value. That is, the temporal change point of the value indicating the distance corresponding to the cores 243' is time 3.

In this case, according to this embodiment, the time axis of another core is displaced as indicated by an arrow in FIG. 7B such that the temporal change points of the values indicating the distances other cores (241' and 242') are superimposed on the temporal change point of the value indicating the distance corresponding to the core (the core 243') for which the final change point appears. That is, in calculation of the sensor-measured values at time 3, the value at time 1 is employed as the value indicating the distance corresponding to the core 241', the value at time 2 is employed as the value indicating the distance corresponding to the core 242', and the value at time 3 is employed as the value indicating the distance corresponding to the core 243'. In this way, in this embodiment it is possible to obtain more accurate values indicating the distances by displacing the time axis to correct deviations in measuring positions.

Step S26

The processing unit 70 outputs the average value calculated in Step S22 or Step S24 as a sensor-measured value.

In this way, the optical measurement system 1 according to this embodiment can perform accurate measurement when the measurement object 80 has a flat profile and when the measurement object 80 has a finely changing profile.

Figure 8:
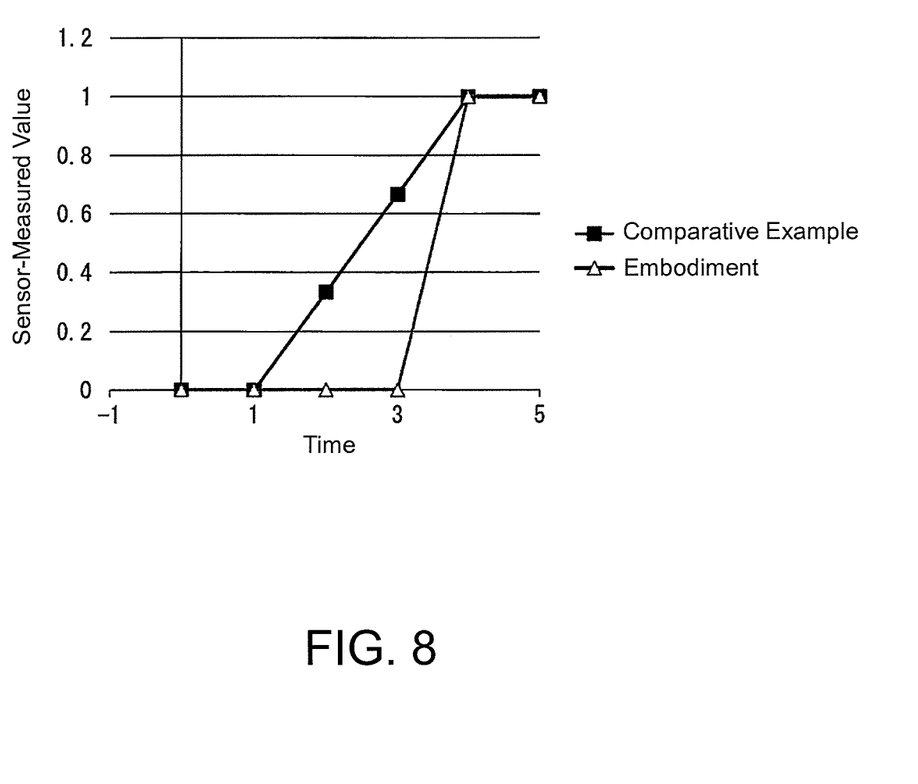
FIG. 8 is a graph illustrating measured values which are acquired by the optical measurement system according to the third embodiment of the invention and measured values which are acquired in a comparative example.

FIG. 8 illustrates sensor-measured values which are acquired by the optical measurement system 1 according to this embodiment and measured values which are acquired by an optical measurement system according to a comparative example.

In the optical measurement device according to the comparative example, the measured values are calculated by indiscriminately averaging a plurality of values indicating a distance without comparing the values indicating the distances which are calculated based on the reflected light beams in the same way as in this embodiment with a threshold value. Since distances measured at a plurality of positions are simply averaged, a rapid height change at a boundary cannot be accurately measured.

On the other hand, in the optical measurement system 1 according to this embodiment, when a condition that all the values indicating the distances are equal to or greater than the threshold value or are less than the threshold value is not satisfied, the time axis for a temporal change of the value indicating the distance corresponding to each core is displaced with reference to the change point of the value indicating the distance corresponding to each core. Accordingly, it is possible to accurately measure a rapid height change at a boundary between a plurality of flat surfaces having different heights in the measurement object 80.

Third Embodiment

Figures 9A, 9B:
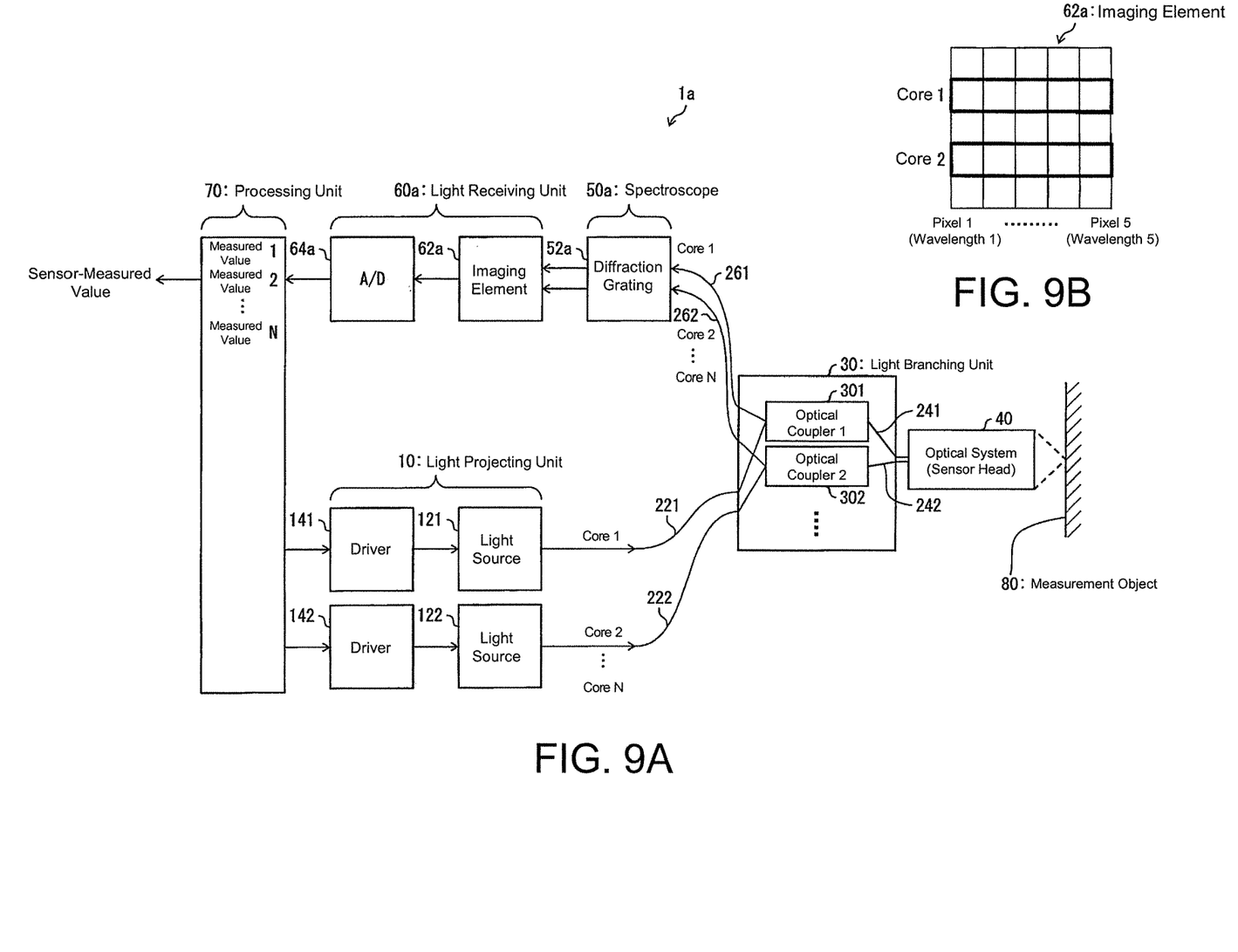
FIGS. 9A and 9B are schematic diagrams illustrating an example of the system configuration of the optical measurement system according to the third embodiment of the invention.

Another embodiment of the invention will be described below with reference to FIGS. 9A and 9B. FIG. 9A is a schematic diagram illustrating an example of a system configuration of an optical measurement system 1$a$ according to a third embodiment.

The optical measurement system 1$a$ according to this embodiment includes a single spectroscope 50$a$ and a single light receiving unit 60$a$. That is, a spectroscope and a light receiving unit are not provided for each of the cores 261, 262, . . . , 26N of the light guide unit 20.

The optical measurement system 1$a$ according to this embodiment includes members having the same functions as the members described in the first embodiment except for the spectroscope 50$a$ and the light receiving unit 60$a$ and thus description of the members will not be repeated.

The light receiving unit 60$a$ includes an imaging element 62$a$ and an A/D converter 64$a$.

As illustrated in FIG. 9B, the imaging element 62$a$ is a two-dimensional imaging element in which a plurality of light receiving elements are two-dimensionally arranged. The light receiving elements which are arranged in the horizontal direction in FIG. 9B receive wavelength components of a reflected light beam corresponding to one core. The light receiving elements which are arranged in a vertical direction in FIG. 9B receive reflected light beams corresponding to the cores.

In this embodiment, the processing unit 70 controls the drivers 141, 142, . . . , 14N such that the light sources 121, 122, . . . , 12N simultaneously emit light. However, the number of light sources may be one or a single light source may apply irradiation light to a plurality of cores 221, 222, . . . , 22N.

Fourth Embodiment

Figure 10:
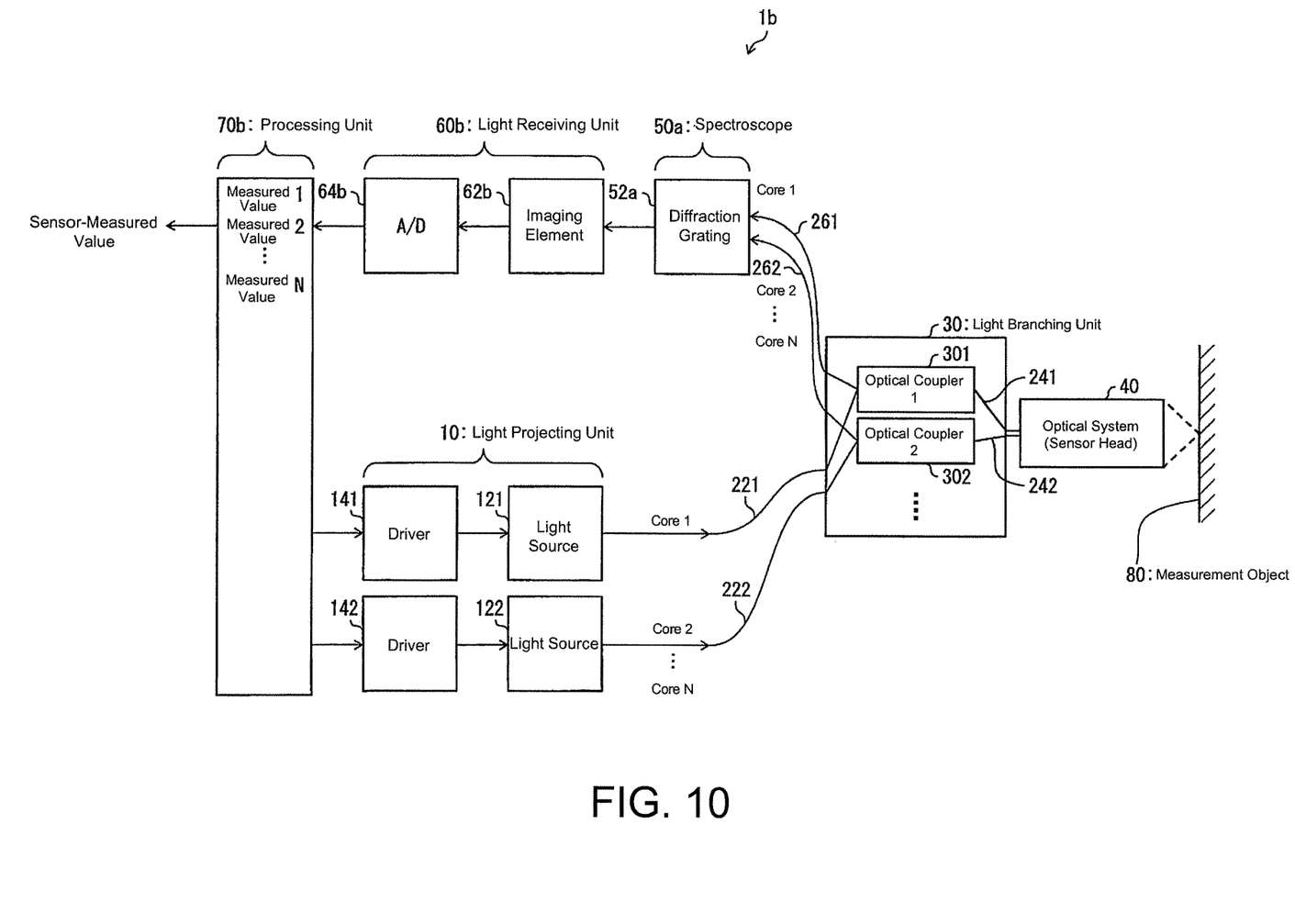
FIG. 10 is a schematic diagram illustrating an example of a system configuration of an optical measurement system according to a fourth embodiment of the invention.

Another embodiment of the invention will be described below with reference to FIG. 10. FIG. 10 is a schematic diagram illustrating an example of a system configuration of an optical measurement system 1b according to a fourth embodiment.

The optical measurement system 1b according to this embodiment includes members having the same functions as the members described in the above-mentioned embodiment except for a light receiving unit 60b and a processing unit 70b and thus description of the members will not be repeated.

In this embodiment, the processing unit 70b controls the drivers 141, 142, . . . , 14N such that the light sources 121, 122, . . . , 12N emit light at different light irradiation times. Accordingly, the light sources 121, 122, . . . , 12N apply irradiation light beams to the corresponding cores 221, 222, . . . , 22N at different light irradiation times. The cores 241, 242, . . . , 24N receive reflected light beams from a measuring surface of a measurement object at different times.

The light receiving unit 60b in this embodiment includes a single imaging element 62b and an A/D converter 64b. The imaging element 62b in this embodiment is a one-dimensional imaging element in which a plurality of light receiving elements are one-dimensionally arranged as in the first embodiment. The imaging element 62b sequentially receives reflected light beams passing through the cores 241, 242, . . . , 24N and the cores 261, 262, . . . , 26N for each core.

What is claimed is:

1. An optical measurement system comprising:
   a light source;
   an optical system disposed to face an irradiation light beam from the light source and configured to irradiate a measurement object with the irradiation light beam and to receive a reflected light beam from a measuring surface of the measurement object;
   at least one spectroscope configured to separate the reflected light beams received by the optical system into wavelength components;
   a light receiving unit in which a plurality of light receiving elements are arranged in a separation direction of the spectroscope;
   a light guide unit configured to include a plurality of cores, to optically connect the light source and the optical system, and to optically connect the optical system and the spectroscope; and
   a processing unit,
   wherein the processing unit is configured to
      calculate a distance between the optical system and the measurement object based on the reflected light beam for each of the reflected light beams corresponding to the cores,
      compare a value indicating the distance with a threshold value for each of the reflected light beams,
      calculate an average value of all the values indicating the distance when the values indicating the distance in the reflected light beams corresponding to all the cores are equal to or greater than the threshold value or the values indicating the distance are less than the threshold value, and
      calculate an average value of the values indicating the distance which are equal to or greater than the threshold value or an average value of the values indicating the distance which are less than the threshold values when the values indicating the distance in the reflected light beams corresponding to some cores are equal to or greater than the threshold value and the values indicating the distance in the reflected light beams corresponding to the other cores are less than the threshold value.

2. The optical measurement system according to claim 1, wherein the processing unit is configured to calculate the threshold value based on the values indicating the distance before and after a change when the distance changes to be greater than a predetermined value.

3. The optical measurement system according to claim 1, wherein the light receiving unit includes a plurality of light receiving units to correspond to the reflected light beams corresponding to the cores.

4. The optical measurement system according to claim 2, wherein the light receiving unit includes a plurality of light receiving units to correspond to the reflected light beams corresponding to the cores.

5. The optical measurement system according to claim 1, wherein the plurality of light receiving elements are arranged two-dimensionally on a light receiving surface of the light receiving unit to correspond to the reflected light beams corresponding to the cores.

6. The optical measurement system according to claim 2, wherein the plurality of light receiving elements are arranged two-dimensionally on a light receiving surface of the light receiving unit to correspond to the reflected light beams corresponding to the cores.

7. The optical measurement system according to claim 1, wherein the light source includes a plurality of light sources and positions at which the measurement object is irradiated with irradiation light beams emitted from the light sources are different from each other, and
   wherein the processing unit is configured to calculate the distance between the optical system and the measurement object based on the reflected light beams for each of the reflected light beams corresponding to the cores by setting a light irradiation time to be different depending on the light sources.

8. The optical measurement system according to claim 2, wherein the light source includes a plurality of light sources and positions at which the measurement object is irradiated with irradiation light beams emitted from the light sources are different from each other, and
   wherein the processing unit is configured to calculate the distance between the optical system and the measurement object based on the reflected light beams for each of the reflected light beams corresponding to the cores by setting a light irradiation time to be different depending on the light sources.

9. The optical measurement system according to claim 1, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

10. The optical measurement system according to claim 2, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

11. The optical measurement system according to claim 3, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

12. The optical measurement system according to claim 4, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

13. The optical measurement system according to claim 5, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

14. The optical measurement system according to claim 6, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

15. The optical measurement system according to claim 7, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

16. The optical measurement system according to claim 8, wherein the processing unit is configured to extract a temporal change point at which the value indicating the distance changes to be equal to or greater than the threshold value for each of the cores, to arrange the temporal change points corresponding to all the cores, and to then calculate an average value of the values indicating the distance which are equal to or greater than the threshold value or an average value of the values indicating the distance which are less than the threshold value.

* * * * *